United States Patent
He et al.

(10) Patent No.: US 9,100,951 B2
(45) Date of Patent: Aug. 4, 2015

(54) SIMULTANEOUS TRANSMISSION OF DIFFERENT TYPES OF FEEDBACK INFORMATION IN A WIRELESS ENVIRONMENT

(75) Inventors: Hong He, Beijing (CN); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 237 days.

(21) Appl. No.: 13/538,813

(22) Filed: Jun. 29, 2012

(65) Prior Publication Data

US 2013/0170443 A1 Jul. 4, 2013

Related U.S. Application Data

(63) Continuation of application No. 61/556,109, filed on Nov. 4, 2011.

(51) Int. Cl.
  G06F 11/00 (2006.01)
  H04J 1/16 (2006.01)
  H04L 12/26 (2006.01)
  H04W 72/04 (2009.01)
  H04W 4/00 (2009.01)
  (Continued)

(52) U.S. Cl.
  CPC ......... *H04W 72/0413* (2013.01); *H04L 1/0026* (2013.01); *H04L 1/1671* (2013.01); *H04W 4/00* (2013.01); *H04L 5/0055* (2013.01)

(58) Field of Classification Search
  CPC ..... H04W 80/04; H04W 84/12; H04W 88/08; H04W 72/0413; H04W 4/00; H04L 1/0026; H04L 1/1671

USPC .......... 370/328, 329, 252, 310, 522, 253, 254
  See application file for complete search history.

(56) References Cited

U.S. PATENT DOCUMENTS 8,675,528 B2 *  3/2014  Khoshnevis et al. ......... 370/310
2010/0124291 A1  5/2010  Muharemovic
(Continued)

FOREIGN PATENT DOCUMENTS

WO  WO 2009/011523 A1  1/2009
WO     2013067354 A1   5/2013

OTHER PUBLICATIONS

International Search Report and Written Opinion received for PCT Patent Application No. PCT/US2012/063328 mailed on Mar. 22, 2013, 10 pages.

(Continued)

*Primary Examiner* — Chuong T Ho
(74) *Attorney, Agent, or Firm* — Thorpe, North & Western, LLP

(57) ABSTRACT

Technology for concurrent transmission of various types of feedback information is disclosed. Different types of feedback information are processed according to a predetermined regime that can allow the various types of feedback information to be separated after combination and transmission to the receiving end of a communication link. Some predetermined regimes may include use of orthogonal carrier codes/sequences, mapping to I and Q branches in a dual branch architecture, and concatenation according to a predefined scheme. Consideration is also made for reducing transmission power levels while insuring transmission of important types of feedback information with respect to the various types of feedback information.

20 Claims, 9 Drawing Sheets

(51) Int. Cl.
*H04L 1/00* (2006.01)
*H04L 1/16* (2006.01)
*H04L 5/00* (2006.01)

(56) References Cited

U.S. PATENT DOCUMENTS

| | | |
|---|---|---|
| 2010/0173659 A1 | 7/2010 | Shin et al. |
| 2010/0195575 A1* | 8/2010 | Papasakellariou et al. ... 370/328 |
| 2010/0211844 A1* | 8/2010 | Yuda et al. .................... 714/749 |
| 2011/0149774 A1 | 6/2011 | Chen et al. |
| 2011/0243066 A1* | 10/2011 | Nayeb Nazar et al. ....... 370/328 |
| 2011/0249578 A1* | 10/2011 | Nayeb Nazar et al. ....... 370/252 |
| 2011/0269490 A1 | 11/2011 | Earnshaw et al. |
| 2012/0033587 A1* | 2/2012 | Papasakellariou et al. ... 370/277 |
| 2012/0087254 A1* | 4/2012 | Yin et al. ...................... 370/252 |
| 2012/0113827 A1* | 5/2012 | Yamada et al. ............... 370/252 |
| 2012/0120817 A1* | 5/2012 | Khoshnevis et al. ......... 370/252 |
| 2014/0177572 A1* | 6/2014 | Papasakellariou et al. ... 370/329 |

OTHER PUBLICATIONS

NTT Docomo et al; "Data-non-associated L1/L2 Control Channel Structure for E-UTRA Uplink"; 3GPP Draft; R1-062741UL L1L2-Data-non-associated control signaling, $3^{rd}$ generation partnership project (3GPP); Oct. 4, 2006, pp. 6, vol. RAN WG1, No. 20061004, Seoul, Korea.

Samsung; "Data and Control Multiplexing in DFT-S-OFDM"; 3GPP draft; R1051039 Datat and control multiplexing, $3^{rd}$ generation partnership project (3GPP); Oct. 4, 2005, pp. 5, vol. RAN WG1, No. 20051004, San Diego, CA.

Samsung; "HARQ-ACK and CSI Multiplexing in PUCCH for DL CA"; 3GPP Draft; R1-113074 A_N_CSI $3^{rd}$ Generation Partnership Project (3GPP); Oct. 4, 2011, pp. 3, vol. RAN WG1, No. 20111010, Zhuhai.

Texas Instruments; "On Proposed Enhancements to Periodic CSI Reporting"; 3GPP Draft; R1-113241 proposed enhancements to periodic CSI reporting $3^{rd}$ Generation Partnership Project (3GPP); Oct. 4, 2011, pp. 5, vol. RAN WG1, No. 20111010, Zhuhai.

* cited by examiner

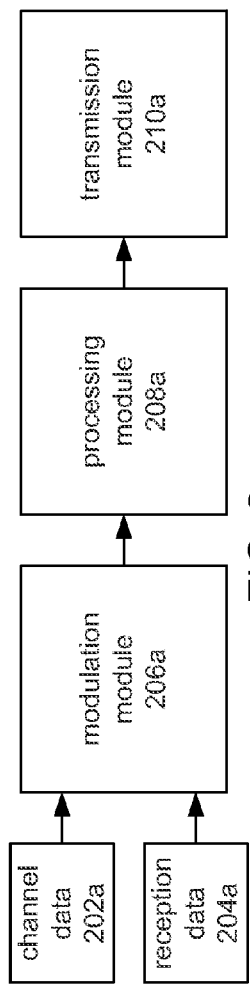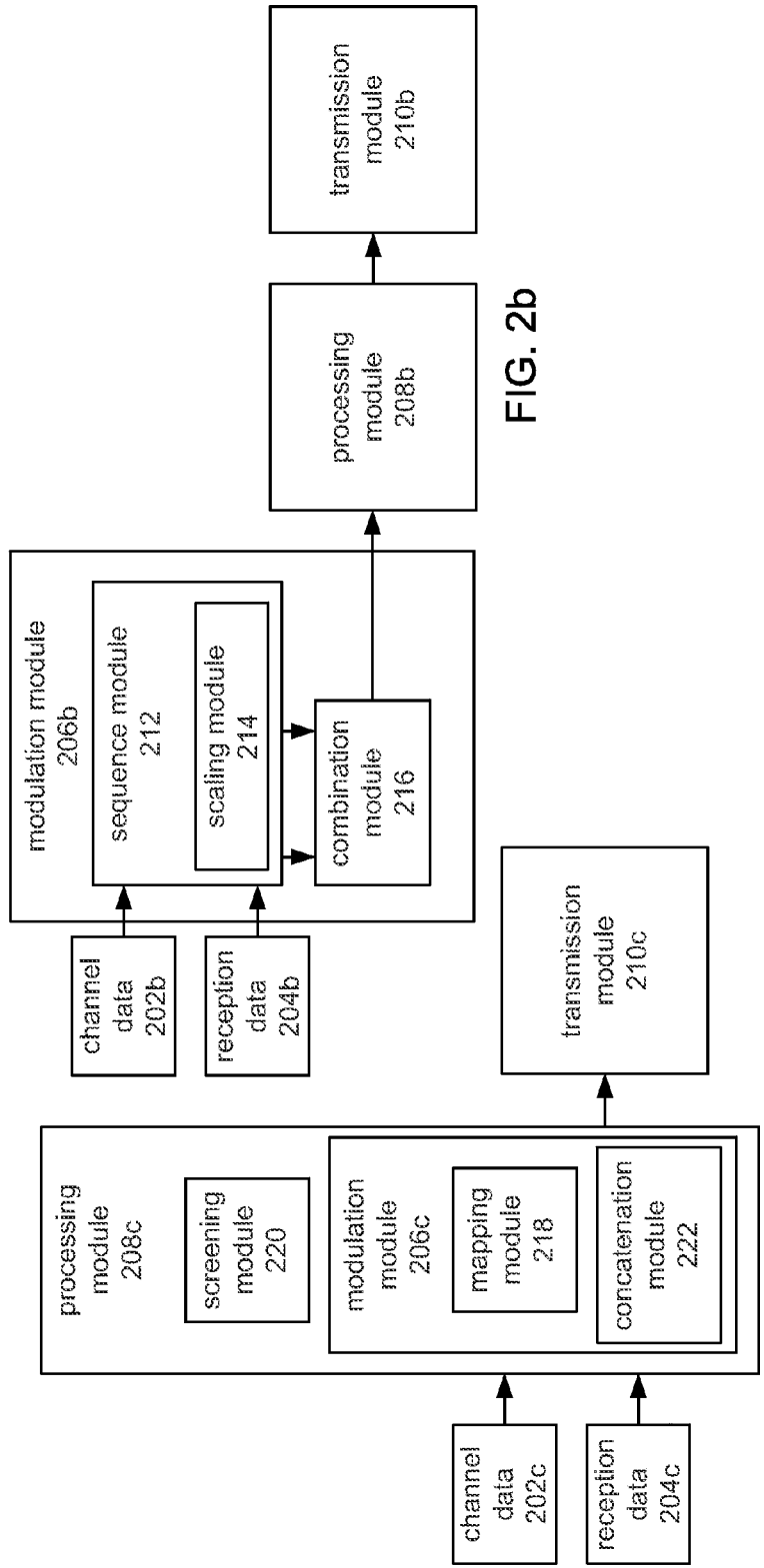

SIMULTANEOUS TRANSMISSION OF DIFFERENT TYPES OF FEEDBACK INFORMATION IN A WIRELESS ENVIRONMENT

RELATED APPLICATIONS

This application claims the benefit of and hereby incorporates by reference U.S. Provisional Patent Application Ser. No. 61/556,109, filed Nov. 4, 2011.

BACKGROUND

Reliable wireless communication services rely on various forms of feedback. Such forms of feedback include information about transmission channels, error coding, and reception information in terms of both positive and negative acknowledgments regarding the reception of data. The Third Generation Partnership Project (3GPP) Long Term Evolution (LTE) specifications and specifications for other wireless standards have outlined various scenarios for the transmission of such data between a User Equipment (UE) and a base station, or an evolved Node B (eNodeB) (uses of eNodeB are considered to apply throughout this application to base stations referred to as enhanced Node B base stations).

As demands on wireless communication systems have increased, wireless systems have incorporated new technologies, such as carrier aggregation, to meet these demands. A combination of increased demands and new technologies, however, have resulted in more complicated feedback protocols and increases in the amount of feedback that needs to be communicated. For example, by adding additional component carriers to the communication environment to increase bandwidth, multiple new cells are created, each using the communication of its own additional feedback information.

In this changing environment, outdated protocols result in inefficiencies and failures. For example, some solutions presuppose that UEs are configured for resources, such as channels, that they may not support. At times, feedback information is even lost. Additionally, resources present under pre-existing specifications may no longer be available, having been allocated to meet the demands of new technologies.

As set forth above, feedback data comes in different varieties. However, increasing amounts of feedback information, together with increasing demands placed on resources within the network make it important to be able to combine this feedback information for efficient transmission. This is problematic, as can be appreciated, because each type of feedback data is typically separated at the receiving end of a communication link to be intelligible. To address these needs, new approaches and protocols are needed that are capable of providing the functionality enabled by previous specifications, preferably enabling improved functionality. These new methods and protocols need to be robust and reliable. Furthermore, they need to accommodate increasing demands and changes without presupposing the existence of resources that may not be present by being able to concurrently transmit the various types of feedback information on a single channel.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2a is a block diagram illustrating the relationships between various modules used to provide improved communication of feedback in accordance with an example;

FIG. 2b is a block diagram illustrating the relationships between various modules used to provide improved communication of feedback in accordance with another example;

FIG. 2c is a block diagram illustrating the relationships between various modules used to provide improved communication of feedback in accordance with yet another example;

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term 'reception information,' can include the terms 'HARQ-ACK/NACK information,' 'HARQ-ACK information,' and 'HARQ-ACK.'

As used herein, the term 'channel information,' can include the term Channel State Information (CSI). Additional forms of channel information can also include, without limitation, a Channel Quality Indicator (CQI) and/or a Pre-coding Matrix Indicator (PMI). Channel and reception information can be viewed as different types of feedback information.

As used herein, the term 'channel data,' can include the term 'CSI.' Additional forms of channel data can also include, without limitation, a Channel Quality Indicator (CQI) and/or a Pre-coding Matrix Indicator (PMI).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
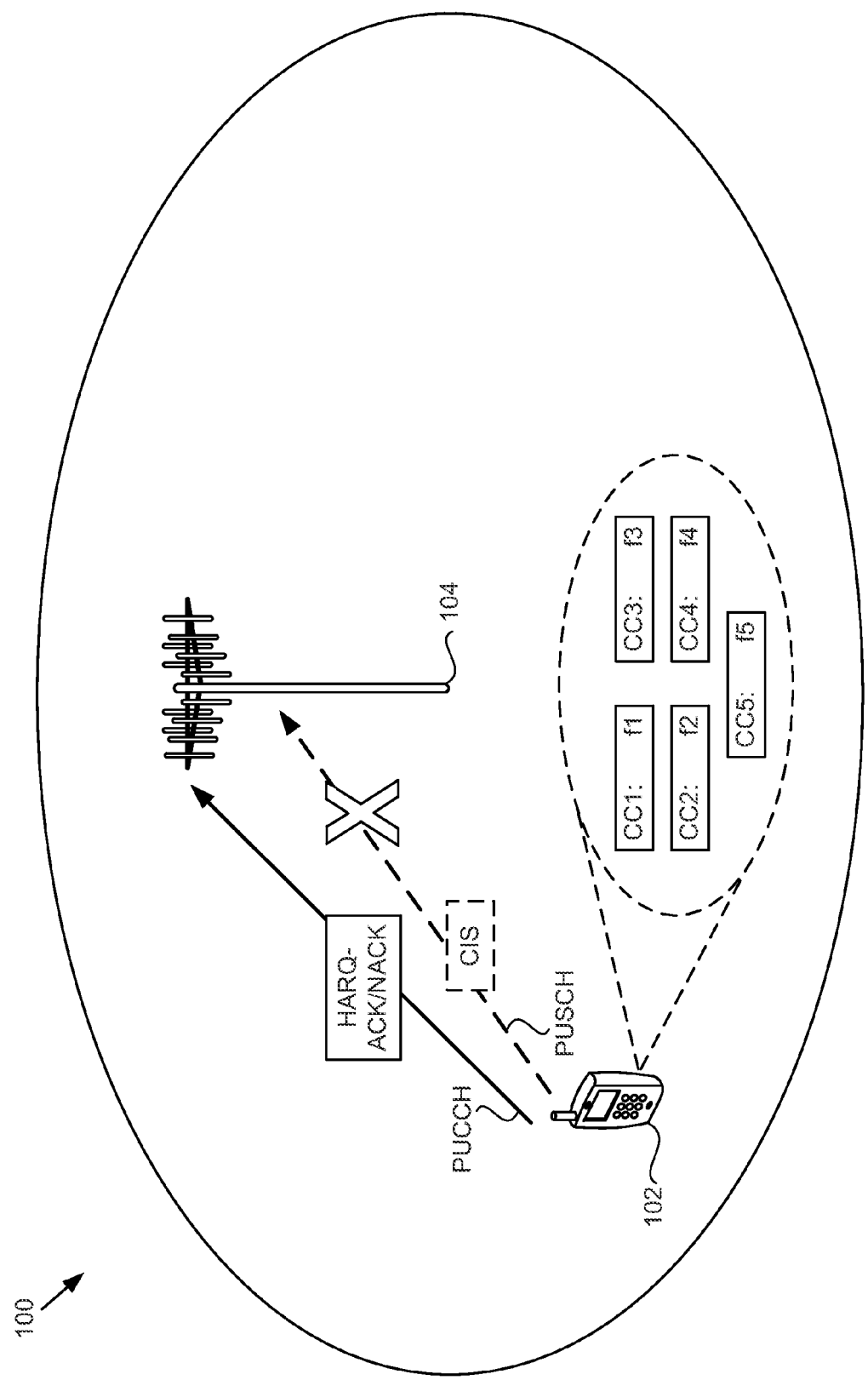
FIG. 1 is a block diagram illustrating a wireless communications environment that gives rise to the need for improved approaches to the communication of feedback.

FIG. 1 illustrates an example of a wireless communications environment 100 that gives rise to the need for improved approaches for the communication of feedback. In the environment, a wireless device 102, such as a User Equipment (UE), can be configured to communicate with a base station 104. The UE can also comprise or be referred to as a mobile station (MS), a mobile wireless device, a mobile communication device, a tablet, a handset, or other type of mobile wireless device. The base station can be, but need not necessarily be, an evolved Node B (eNodeB or eNB). As an important statement of the generality of embodiments discussed in this disclosure, while the terminology of the 3GPP LTE standard is often used throughout this specification, it is not intended to be limiting, and there are exceptions in the use of more general terminology in portions of this specification to further communicate this point. A UE 102 configured to communicate with an eNodeB 104 is considered to be synonymous with a generic radio frequency mobile communication device configured to communicate with a base station, unless otherwise noted. Similar comments can be made with respect to other terms used herein.

A wireless device such as UE 102 can be configured to provide feedback information from the UE 102 to the eNodeB 104. In one embodiment, the feedback information can be categorized into two types of feedback information, namely, reception information and channel information. Reception information can include feedback information in the form of Hybrid Automatic Retransmission reQuest (HARQ) information, including ACKnowledgments and/or Negative ACKnowledgments for information received at the UE from the eNodeB, i.e., HARQ-ACK/NACK information. Channel information can include information in the form of Channel State Information (CSI). The overall amount of channel information and reception information that is provided as feedback from the UE 102 to the eNodeB 104 can be greatly increased by the aggregation of component carriers for which a UE 102 can be configured to transmit and/or receive data on different frequencies corresponding to the different component carriers (CCs). Release 10 of 3GPP LTE supports the aggregation of carries sufficient for the formation of up to 5 cells. This is illustrated in FIG. 1, which shows CC1 through CC5. While each CC is illustrated as being located at a single location, it is possible that each CC may be located at a separate location. The locations can be macro nodes, such as eNodeB 104, designed to communicate over a large area, or low power nodes, designed to communicate over a smaller area than macro nodes, such as a pico cell, a femto cell, a home eNodeB, and so forth. Each cell can periodically report channel and reception information, greatly adding to the amount of feedback information for transmission from the UE to the eNodeB.

A wireless device such as UE 102 is typically configured for simultaneous transmission along a Physical Uplink Control CHannel (PUCCH) and a Physical Uplink Shared CHannel (PUSCH). These two channels are used to avoid collisions between channel feedback information and cell reception data for multiple cells for which the UE can also be configured. As depicted in FIG. 1, feedback information regarding the reception of data, such as the HARQ-ACK/NACK information, may be transmitted on the PUCCH. The channel information, such as CSI and PMI, can be transmitted on the PUSCH.

However, the assumption that a UE 102 and/or a given serving cell of a UE is configured for simultaneous PUCCH and PUSCH transmission is often not correct. Where the UE is only configured for PUCCH transmission, as depicted in FIG. 1, the channel information may be dropped in favor of communicating only reception information, leading to reduced reliability and efficiency. In accordance with one embodiment of the present invention, reception information and channel information can be multiplexed on a single channel to allow both forms of feedback information to be communicated, even when the PUCCH and PUSCH are not transmitted simultaneously.

FIG. 2a illustrates one example of a flow of operations to be performed on channel information and reception information, also referred to as channel data 202a and reception data 204a. The operations can be performed to multiplex the channel and reception data in such a way that it can be separately recovered after transmission. Channel data and reception data can be thought of and/or referred to as a first series of data and a second series of data respectively. In the figure, the various operations are depicted in terms of modules which can perform the operations. These modules can be embedded in computer readable code residing in non-volatile memory or other physical hardware residing with a UE 102. Such modules can include a modulation module 206a, a processing module 208a, and a transmission module 210a.

The modulation module 206a is configured to modulate the channel data 202a and the reception data 204a in accordance with a modulation scheme, which can also be thought of as a predetermined regime. The modulation scheme is configured to enable the channel information, which can be considered as a first series of data that can carry CSI, and the reception information, which can be considered as a second series of data that can carry HARQ-ACK information, to be separated, or isolated, from one another, after the channel information and the reception information have been combined.

Examples of such modulation schemes, discussed in further detail below, include, without limitation, the use of orthogonal carrier codes, also referred to herein as orthogonal sequences corresponding to the two series of data, (i.e., orthogonal multiplexing), the use of distinct branches of a dual branch modulation and coding scheme, and concatenation according to a predetermined concatenation scheme that is either possessed by the receiving end of the communication link receiving the combined information and/or communicated to the receiving end. The predetermined regimes embed a first component of additional data into the channel data/first series of data 202*a*, resulting in a first signal, and a second component of additional data into the reception data/second series of data 204*a*, resulting in a second signal. The first and second components of additional information can be used in the process of separating/isolating the channel data and the reception data after the first signal and second signal have been combined to produce a combined signal, transmitted from a wireless device.

The combined information is then processed by a processing module 208*a*, resulting in a processed signal for transmission. The processing module can perform processing operations on the combined information that are generally performed on information to be transmitted by the UE on which the processing module operates. Such operations can include, without limitation, operations consistent with Discrete Fourier Transform-Spread-Orthogonal Frequency Division Multiplexing (DFT-S-OFDM) for Single Carrier-Orthogonal Frequency Division Multiplexing (SC-OFDM), as defined for the uplink transmission in various releases of 3GPP LTE. Other approaches to processing are also possible. Once the combined information has been combined and processed, the combined information can be transmitted.

The combined information can be transmitted by a transmission module 210*a*, which can include one or more antennas (not shown). The transmission module is configured to prepare the combined information for transmission in accordance with one or more transmission modes. In one embodiment, a transmission mode that is supported by 3GPP LTE standards may be used, such as, without limitation, switched diversity and Multiple Input, Multiple Output (MIMO) transmission. The transmission module also accomplishes the transmission of the combined information.

FIG. 2*b* illustrates another flow of operations in terms of modules that accomplish operations to be performed on channel information and reception information on a UE 102 in accordance with an example. Again, a modulation module 206*b* modulates channel data/first series of data 202*b* and reception data/second series of data 204*b* in accordance with a predetermined regime. In FIG. 2*b*, the modulation scheme employed by the modulation module comprises combining channel data with a carrier code. The reception data is also combined with a carrier code. In the embodiment, the carrier codes are provided by a sequence module 212.

Depending on the embodiment, the sequence module 212 can simply provision the modulation module 206*b* with different carrier codes for combination with channel and reception data 202*b*, 204*b*. Alternatively, the sequence module can also generate the carrier codes. In certain embodiments, the carrier codes are orthogonal carrier codes/orthogonal sequences, which are substantially orthogonal one to another.

In some embodiments, a scaling module 214 adjusts the power of a signal associated with channel data 202*a*, the reception data 204*b*, or both. In embodiments discussing the scaling of power, a hypothetical power scaling factor of 1 can be applied to either a signal associated with channel data, reception data, or both, where a power scaling factor is to be applied to one or both of these signals. In some embodiments, it may be preferable that the power of one or more of these signals is not changed. Depending on the embodiment, the scaling module can perform its operations on the data either before, after, or during the combination of the carrier codes with the channel data and the reception data. In certain embodiments, no scaling of power takes place. The scaling of power on the channel data and the reception data can be performed to ensure an acceptable Bit Error Rate (BER) commensurate with the importance that a particular type of feedback data be received.

After the channel and reception data 202*b*, 204*b*, and/or a first signal and a second signal respectively associated therewith, have been combined with the carrier codes provided by the sequence module 212, they are combined with one another by the combination module 216. The combination module can include a summer. The combined channel and reception data, embedded with the carrier codes, is next processed by a processing module 208*b* and transmitted from the UE by a transmission module 210*b*, as previously discussed with respect to FIG. 2*a*.

FIG. 2*c* illustrates yet another flow of operations which can be performed on channel and reception information. As with the other figures, FIG. 2*c* depicts channel data/first series of data 202*c* and reception data/second series of data 204*c* that are modulated, processed, and transmitted by a modulation module 206*c*, a processing module 208*c* and a transmission module 210*c*, respectively. However, the modulation module in FIG. 2*c* is embedded in the processing module to show the flexibility with which the operations of the modulation module and the processing module can be performed. Depending on the embodiment, the processing module can also precede the modulation performed by the modulation module. In other embodiments, the operations of the modulation module and the processing module can be interleafed and/or coterminous.

The modulation module 206*c* also includes a mapping module 218 for embodiments discussed in further detail below in which the different types of feedback information are mapped on different branches of a dual branch modulation and coding scheme. Although the mapping module may not be used in embodiments employing the screening module 220 and the concatenation module 222, and vice versa, the modules are depicted in FIG. 2*c* to show their overall relationship to the processing module 208*c* and the modulation module 206*c*.

The screening module 220 is used to determine whether embodiments making use of the concatenation module 222 are appropriate, as discussed in further detail below. The screening module can also determine that approaches relying on carrier codes are appropriate, as also discussed below. The concatenation module concatenates channel data 202*c* and reception data 204*c* according to a predetermined scheme.

Figure 3:
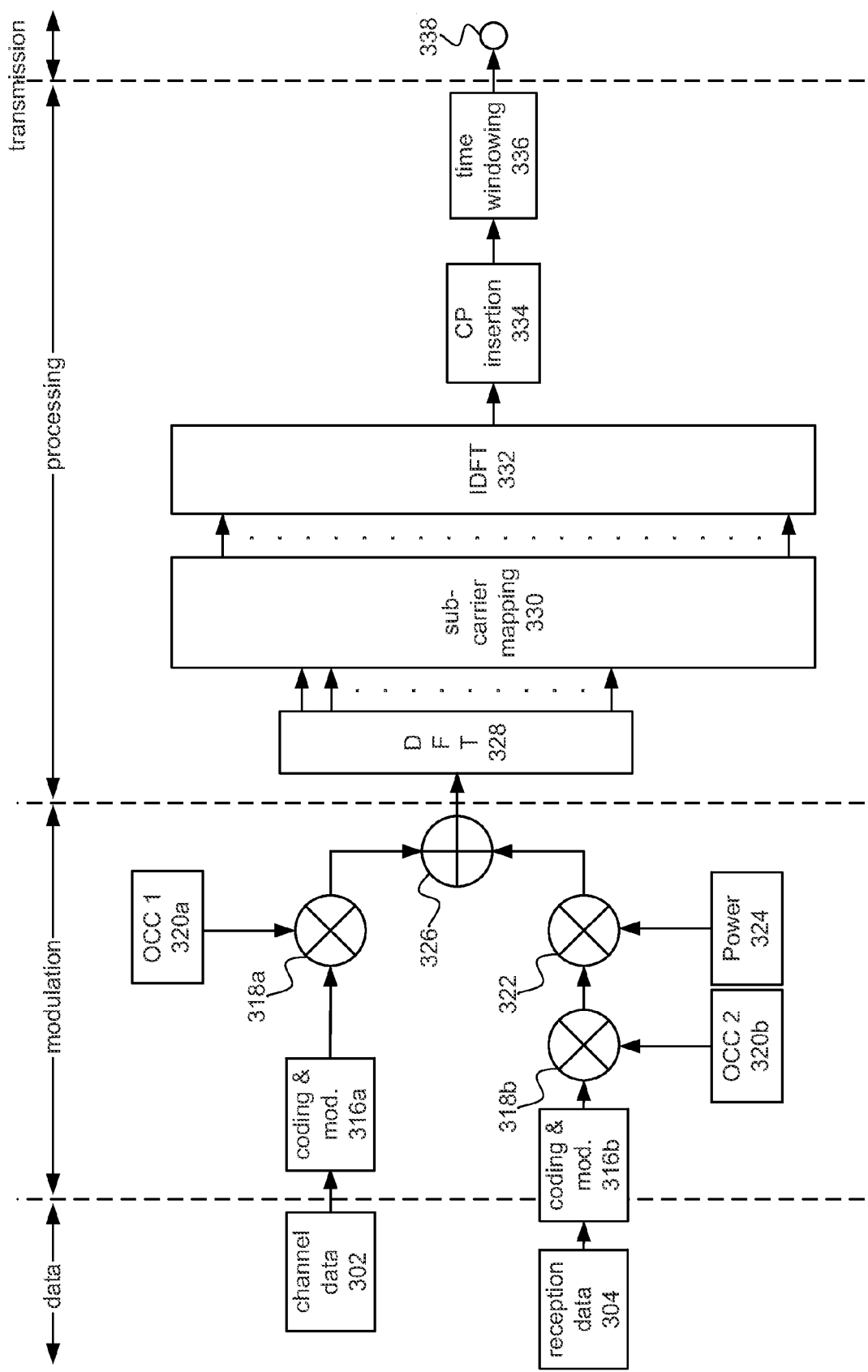
FIG. 3 is a block diagram illustrating an implementation of a process employing orthogonal carrier codes for improved communication of feedback in accordance with an example.

FIG. 3 illustrates an implementation of a process on a UE for employing orthogonal multiplexing, or the use of orthogonal carrier codes/sequences to allow channel and reception data to be combined in such a way that it can be separately recovered after transmission. The implementation includes modulation, processing, and transmission phases that operate on data in a manner that is consistent with the modules described in the preceding figures. As with the preceding figures, the data includes channel data 302 and reception data 304.

Both the channel data/first series of data 302 and the reception data/second series of data 304 are provisioned to coding and modulating modules 316*a*, 316*b*. The channel and reception data can be provisioned to the coding and modulating modules as bits to which error correction coding, constellation mapping, or other coding and modulation operations may or may not be applied.

The result from the coding and modulating modules 316*a* acting substantially on the channel data 302, to the exclusion of the reception data 304, is fed to a first coding multiplier 318*a*. The first coding multiplier is also fed a first orthogonal carrier code (OCC) from a first OCC module 320*a*. The first OCC module is configured to provision, store, and/or generate the first orthogonal carrier code.

Similarly, the result from the coding and modulating module 316b acting substantially on the receiver data 304, to the exclusion of the channel data 302, is feed to a second coding multiplier 318b, which is also fed a second orthogonal carrier code from a second OCC module 320b. The second OCC module has functions similar to those of the first code module 320a. The two orthogonal carrier codes provided by the first OCC module and the second OCC module are substantially orthogonal to one another.

In certain embodiments, the first code module 320a and the second code module 320b are in communication with one another to produce substantially orthogonal carrier codes. They may be viewed as performing the functions of the sequence module 212 of the previous figure, whether alone or in conjunction with the first coding multiplier 318a and the second coding multiplier 318b. If more than two different types of feedback information are involved, additional carrier codes can be supplied.

In some embodiments, but not all such embodiments, embedding a first component of additional information and a second component of additional information is accomplished by orthogonal multiplexing with a first and second orthogonal sequence in a single Physical Resource Block (PRB) semi-statically allocated for the channel data to concurrently transmit CSI and HARQ-ACK information. In additional embodiments, orthogonal multiplexing in the single PRB further comprises block spreading the channel data carrying the CSI with a first sequence. Similarly, the reception data carrying the HARQ-ACK is block spread with a second, substantially orthogonal sequence. In some of these embodiments, a signal associated with the channel and/or reception data can be multiplied by a power scaling factor after block spreading.

As an additional consideration, not all types of feedback information are of equal importance and, therefore, can be transmitted at different levels of power, depending on how essential reception of a given type of feedback information is. In networks of increasing complexity, transmitting at power levels that are too high leads to interference. Efforts can be made, therefore, to reduce transmission power levels, when possible. In combining various types of feedback information, consideration can be made for power requirements relative to the various types of feedback information for efficient power use.

To address these concerns, the information carried by the reception data can be fed into a scaling multiplier 322 to increase the power of the signal carrying the reception data 304 relative to the signal carrying the channel data 302. A power increase is fed into the scaling multiplier from a power source 324. By increasing power for the reception data, the likelihood of its reception is increased. Depending on the embodiment, a similar scaling multiplier and power source can be used to adjust the power of the signal carrying the channel data 302. Depending on the embodiment, one or more scaling multipliers and/or one or more power resources can be viewed as making up a scaling module 214. In certain embodiments, power scaling may not be necessary.

After modulating with orthogonal carrier codes and any power scaling processes have occurred, both the signal carrying the channel data 302 and the signal carrying the reception data 304 are fed to a summer 326. The summer 326 accomplishes the combination of the two signals and may be viewed as one example of an implementation accomplishing the functionality of the combination module 216. Although the information from the channel data and the reception data have been combined, the first and second orthogonal carrier codes respectively combined with the channel data and the reception data, i.e., first and second components of additional data, can allow the channel data to be separated from the reception data at the receiving end of a communication link.

The functionalities provided by any combination of the first coding multiplier 318a, the second coding multiplier 318b, the first code module 320a, the second code module 320b, the scaling multiplier 322, the power resource 324, and the summer 326 may be viewed as consistent with any of the modulation modules 206a, 206b, 206c of the previous figures. The functionalities provided by the coding and modulating modules 316a, 316b may be viewed as consistent with functionalities provided by either the modulation modules 206a, 206b, 206c and/or the processing modules 208a, 208b, and 208c.

After the production of a combined signal, many of the processing operations associated with 3GPP LTE transmission, as defined in various 3GPP LTE Releases, can be performed. The functionalities described below may be viewed as consistent with one, but not all, of the functionalities provided by the processing modules 208a, 208b, and 208c. As shown in FIG. 3, a Discrete Fourier Transform (DFT) module 328 can be allocated to perform a Fast Fourier Transform (FFT) on the modulated and combined signal carrying channel data 302 and reception data 304.

A sub-carrier mapping module 330 can also be allocated to map the frequency domain results of the DFT 328 to different sub-carriers of a component carrier. The sub-carrier module maps the frequency domain results of the DFT to different sub-carriers while reserving certain sub-carriers for data from other UEs. An Inverse Discrete Fourier Transform (IDFT) module 332 can then be allocated to perform an inverse Fourier transform on the sub-carriers allocated for the DFT results and those allocated for other UEs. The inverse Fourier transform is used to transform the data back into the time domain. The size of the FFT performed by the IDFT will be larger than the size of the FFT performed by the DFT to accommodate the sub-carriers reserved from other UEs. Thus, the output of the IDFT may not be the same as the input to the DFT.

The results of the IDFT 332 can be fed for further processing by a Cyclic Prefix (CP) insertion module 334 that adds CPs, by the 3GPP LTE specification, such as releases 8, 9 or 10. A time windowing module 336 can then be allocated to provide windowing operations, as also defined in the releases of 3GPP LTE. The foregoing description is consistent with DFT-S-OFDM processing, which is consist with SC-OFDM, the modulation scheme used for uplink transmission within 3GPP LTE. Additional implementation information can be found in the various releases of the 3GPP LTE specification. Additional processing operations not discussed, can also be applicable. Such processing operations can include carrier constellation mapping and serial to parallel conversion in preparation for the DFT 328.

After modulation and processing of the channel data 302 and the reception data 304, the data is ready for transmission. Transmission is accomplished by means of transmission resources 338, which can include one or more antennas and modules capable of preparing the data for transmission consistent with various transmission regimes defined by the releases of the 3GPP specification. The transmission resources 338 can be viewed as providing functionalities consistent with those of the transmission modules 210a, 210b, and 210c of previous figures.

Figure 4:
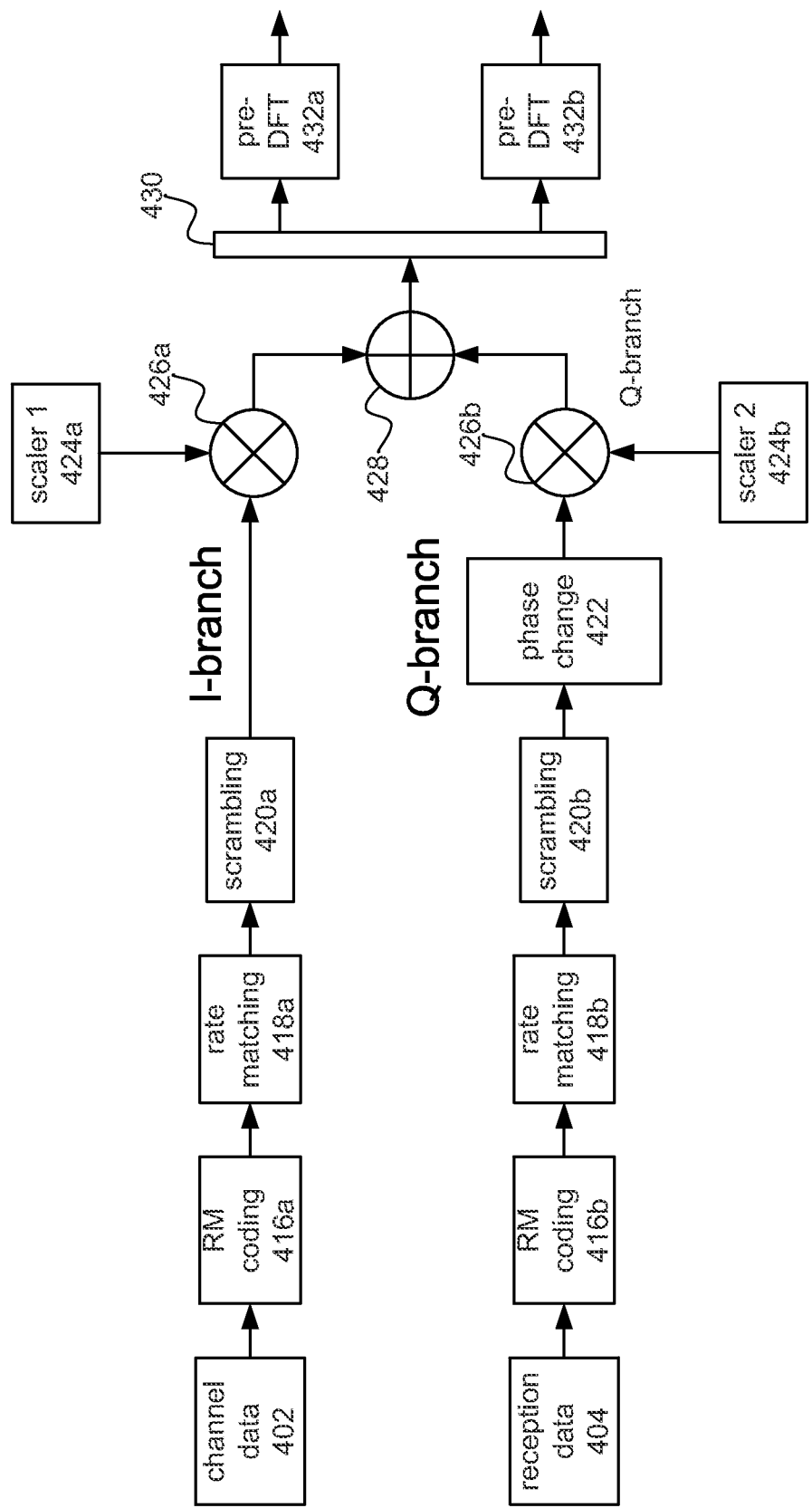
FIG. 4 is a block diagram illustrating an implementation of a process employing the segregation of different types of information along different branches of a dual branch modulation and coding scheme in accordance with an example.

FIG. 4 illustrates an implementation of a process on a UE for employing separate branches belonging to a modulation scheme to allow channel/a first series of data 402 and reception data/a second series of data 404 to be combined in such a way that it can be separately recovered after transmission.

Wireless networks use a variety of Modulation and Coding Schemes (MCS), such as, without limitation, Binary Phase-Shift Keying (BPSK), Quadrature Phase-Shift Keying (QPSK), 16 Quadrature Amplitude Modulation (QAM), and 64 QAM. In digital quadrature modulation and coding schemes, unique patterns of binary digits are assigned to a finite number of phases.

The phases occupy spaces located at maximal distances one from another in a two dimension space within which the 360 degrees, or $2\pi$ radians, of all potential phases can be expressed. The location of each of the finite number of phases used can be described in a Cartesian coordinate system with respect to two axes of this two dimensional space. The location of a phase with respect to these two axes can be used to describe a complex number. The two components of this complex numbers (real and imaginary) can be mapped to different branches, commonly referred two as the I Branch and the Q Branch.

Although BPSK only assigns bits to two phases, meaning that such a modulation scheme can be defined in one dimension on a single axis between the two opposite phases, BPSK can function in a modulation and coding scheme with a separate I Branch and Q Branch by assigning a complex number and the negative of its complex conjugate to the two phases. 3GPP LTE Release 10 applies such an approach so that irrespective of the MCS, whether it is BPSK, QPSK, 16 QAM, 64 QAM, or something else, the same architecture with an I Branch and a Q Branch can be applied.

This dual architecture comprising an I Branch and a Q Branch can be harnessed to allow channel data 402 and reception data 404 to be combined in a way that allows them to be separated after they are combined and transmitted to a receiving end of a communication link, such as an uplink to an eNodeB. As depicted in FIG. 4, the channel data is mapped to the I-branch within such an architecture, and the reception data is mapped to the Q-branch. However, it is possible to invert this mapping. The mapping of the channel data and the reception data to two distinct branches can be viewed as consistent with functionalities provided by the modulation modules 206a, 206b, 206c of previous figures. Also, the mapping of the channel data and the reception data to these two branches can be viewed as providing a first and second component of additional data which can be used to isolate the channel and/or reception data after they have been combined.

Once channel data 402 and reception data 404 are mapped to different channels, operations are performed on them consistent with the operations that can be attributed to potential functionalities performed by a processing module 206a, 206b, and 206c. As depicted in FIG. 4, this processing can be accomplished by modules within the UE allocated to perform different functions. Such modules can be mirrored along each of the two branches and can include a Reed-Muller coding module 416a, 416b, a rate matching module 418a, 418b, and a scrambling module 420a, 420b.

Details of how the functionalities of these various physical resource blocks can be found in various releases of the 3GPP LTE specifications. However, by way of a brief overview, the Reed-Muller coding modules 416a, 416b apply one or more linear error-correcting codes from a family of such codes known as Reed-Muller codes for the purpose of error correction. The rate matching modules 418a, 418b perform rate matching functions to match the amount of transmission data to the available capacity of the different physical channels, either through puncturing or repeating data. The scrambling modules 420a, 420b give the transmitted data useful properties for purposes of communication by, for example, changing the probability for the occurrence of problematic sequences.

A phase change physical module 422 is then applied to one of the branches. In the embodiment depicted with respect to FIG. 4, the phase change is applied to the Q-branch. However, in alternative embodiments, the phase change module 422 applies a phase change to the I-branch. A phase change can also be applied to both branches. The one or more phase changes make the I-branch and the Q-branch substantially orthogonal to one another. The phase change physical module 422 and its functionality may also be viewed as consistent with functionalities provided by the modulation modules 206a, 206b, 206c of previous figures.

Also consist with functionalities provided by the modulation modules 206a, 206b, 206c and/or the scaling module 214 are functionalities provided by scalar one 424a and scalar two 424b, which are modules configured to provide a power source at a predetermined power. Similarly, the functionalities provided by a first scaling multiplier 426a and/or a second scaling multiplier 426b are consistent with functionalities provided by the modulation modules 206a, 206b, 206c and/or the scaling module 214. The scaling functionalities provided by scalar one 424a, scalar two 424b, scaling multiplier one 426a, and/or scaling multiplier two 426b adjust the power on the two branches relative to one another. In this way, power can be conserved on the branch with the channel data 402 and successful transmission of the reception data 404 can be insured. In some embodiments, the different power scaling factors can be applied to the channel data and the reception data before mapping to the two different branches.

A combination module 428, which in some embodiments can be a summer 428, is also provided. The summer 428 in FIG. 4 combines the information on the I-branch with the information on the Q-branch to produce a combined signal. The functionalities provided by the summer 428 are consistent with functionalities provided by modulation modules 206a, 206b, 206c and/or a combination module 216.

In certain embodiments, the combined signal can be divided by a dividing module 430 to allow the combined signal to be transmitted in two slots of the same sub-frame. Two pre-DFT modules 432a, 432b are provided with pre-DFT processing capabilities, which can include constellation mapping and/or serial to parallel conversion. The two pre-DFT modules may be viewed as consistent with functionalities provided by processing modules 208a, 208b, 208c. Additional processing performed in preparation for transmission, including DFT, has been discussed with respect to the previous figure.

Figure 5:
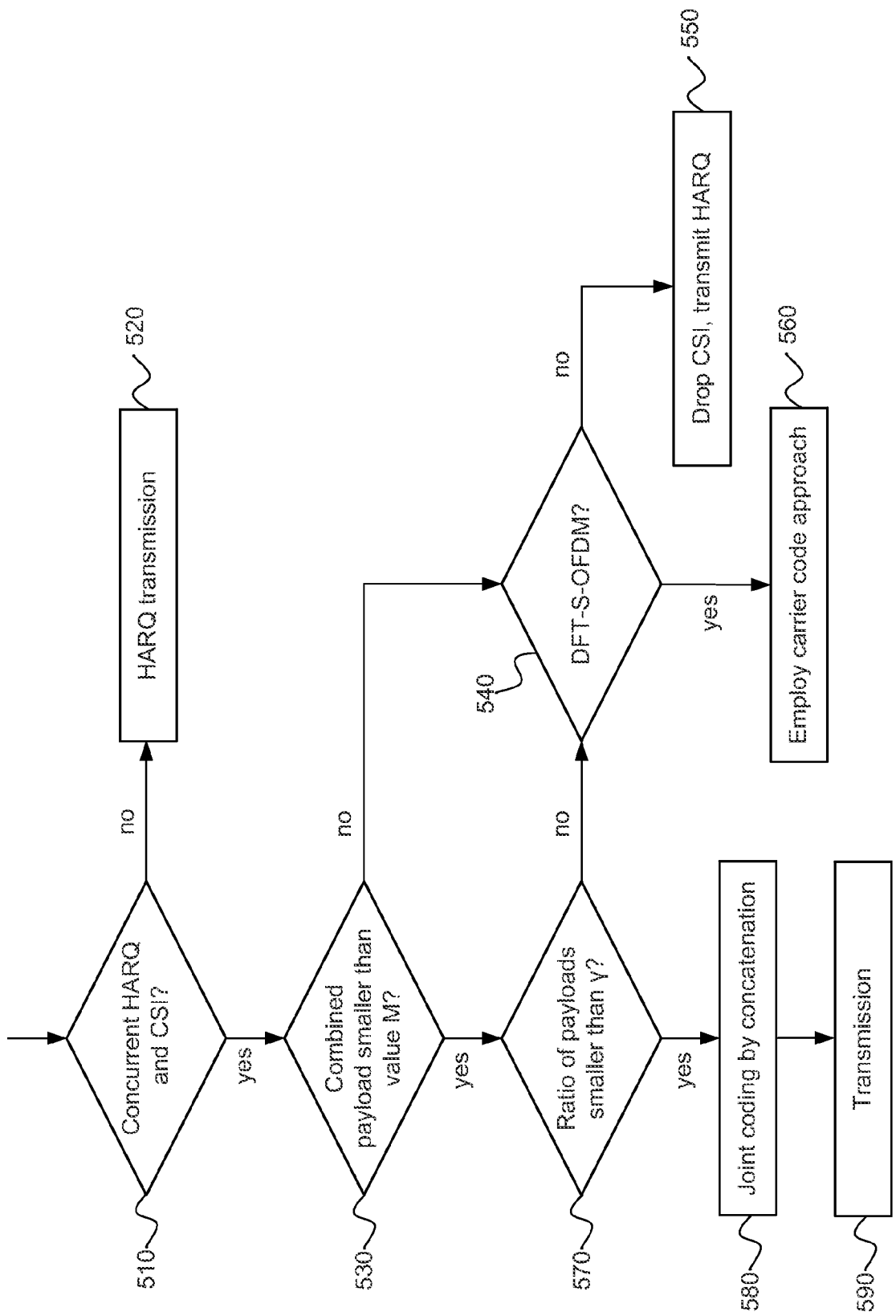
FIG. 5 is a flowchart depicting a decision process for determining the appropriateness of employing different embodiments to provide improved communication of feedback in accordance with multiple examples, including a process employing the concatenation of different types of feedback data in accordance with another example.

FIG. 5 illustrates an implementation of a process on a UE for employing a concatenation scheme to allow channel data/a first series of data and reception data/a second series of data to be combined in such a way that it can be separately recovered after transmission. By concatenating channel data and reception data according to a predefined concatenation scheme, a combined signal is embedded with a code that can be used to separate the channel data and the reception data. To separate the channel data and the reception data the receiving end of a communication link, which can be an eNodeB, relies on possession of information about the concatenation scheme. In embodiments where the receiving end is not already in possession of this information, it can be communicated to the receiving end prior to, during, and/or after the transmission of the combined signal. Positions assigned to channel and reception data may be viewed as first and second components of additional data, respectively.

Unlike other embodiments discussed above, however, embodiments relying on concatenation present obstacles to providing different power levels with respect to channel data and reception data. Because of the importance of accurate and reliable reception of one of the forms of data, usually the reception data, the combined concatenation data is typically transmitted at a relatively high power. The higher power level also allows the reception data to be communicated with a lower order MCS, such as, without limitation, BPSK. However, in wireless communication environments where power of transmission is at a premium, questions arise as to whether this is always justified.

Power is at a premium not only to extend batter life on a UE, but also to avoid interference. To handle greatly increasing demands on wireless networks, technologies such as carrier aggregation and heterogeneous networks have come to be relied upon. Unfortunately, these technologies increase the likelihood of interference on increasingly crowded networks. To avoid interference, it is often advantageous not to blast out transmissions at high powers and to coordinate the power of transmissions.

Therefore, a justification for power allocation is often desirable. To transmit relatively less important information at relatively high levels reserved to insure the reception of more important information is only justifiable in certain scenarios. Such a justification can obtain where a sufficiently small amount of information of less importance, which would otherwise be transmitted at a lower power, is included with more important information for transmission at a higher power that is appropriate for the more important information. The transmission at the higher power may only be justified for a short period, so it can be important to ensure that the amount of important information transmitted at the higher power is not too large.

Scenarios meeting these justifications can include scenarios where the combined payload of both the less important information, which can be referred to throughout this application as "a first data series payload size" and "a CSI payload size," and the more important information, which can be referred to throughout this application as "a second data series payload size" and "a HARQ-ACK payload size," is relatively small. A threshold level can be defined at a particular, predetermined value M for the maximum justifiable size of the data, as measured in bits. This threshold can be defined in certain embodiments by the combined payload.

Another such scenario can be defined for situations where an amount of relatively less important information is relatively small compared to an amount of relatively more important information. Although many ratios can be possible, a ratio of 1 to 3 or less can be used in certain embodiments. The predetermined ratio, γ, can be defined in terms of relative payloads. For example, in one embodiment, a payload carrying relatively less important CSI information may be about a third as large as a payload carrying more important HACK/NACK information. While example limitations are provided herein, they are not intended to be limiting. The ratio can be larger than 1 to 3, depending on the environment in which the wireless signals travel, system limitations, and so forth, as can be appreciated.

Because of the desirability of justifying power allocations, embodiments relying on concatenation can be preceded by a decision process that can be implemented by code embedded in non-volatile memory in communication with a processor and/or by dedicated hardware. A decision process consistent with certain embodiments is depicted in FIG. 5. The decision processes begins by determining 510 whether both channel data and reception data are available for concurrent transmission. In certain embodiments, as discussed above, reception data can comprise HARQ-ACK/NACK information and channel data can comprise CSI information, but other forms of channel and reception data are possible.

If only reception data is present, possibly in the form of HARQ-ACK/NACK information, then there is no need for concatenation, and the process proceeds with transmission of the reception data, such as a HARQ transmission 520 in this example. If both channel data and reception data are available for concurrent transmission, however, the process proceeds to a determination 530 whether a first condition about the size of a combined transmission is met. In FIG. 5, this size condition is couched in terms of the combined payload relative to a predetermined threshold value M, but other approaches for evaluating the size of the combined transmission are possible.

If the combined payload is not less than a threshold value M, a modulation scheme determination 540 is made, by which it is determined whether the UE supports a DFT-S-OFDM modulation and coding scheme. If the UE does not support a DFT-S-OFDM modulation and coding scheme, there are no other resources for combining channel information and reception information. Since the required power allocation for a concatenation approach is not justified, the relatively less important information is dropped 550, and the relatively more important information is transmitted 550. In the embodiment depicted in FIG. 5, the relatively less important information is channel data in the form of CSI, and the relatively more important information is reception data in the form of HARQ information, but other scenarios, as appreciated, are possible.

Conversely, if the UE supports a DFT-S-OFDM modulation and coding scheme, the process proceeds to employ 560 an embodiment for the concurrent transmission of channel and reception data consistent with embodiments described above with respect to FIG. 3, which rely on substantially orthogonal carrier codes. Possible scenarios have been discussed previously as to how transmission might proceed where the combined signal is too large to justify power allocation for a concatenation approach. Other possibilities exist where the size condition 530 warrants a concatenation approach.

In certain embodiments, a result that a concatenation approach is warranted based on the size condition 530 is all that is necessary. In such embodiments, joint coding by concatenation 580 proceeds followed by transmission 590. In other embodiments, an additional ratio determination 570 is made, corresponding to a second condition, before proceeding with concatenation 580 and transmission 590. The ratio determination determines 570 if the size of relatively less important information relative to relatively more important information is sufficiently small. In FIG. 5, this determination is made in terms of the payload size of channel data relative to the payload size of reception data in relation to a predetermined threshold value, γ, but other approaches are possible.

If the ratio is not sufficiently small, the process proceeds to the modulation scheme determination 540, from which the process can play out according to different scenarios discussed above with respect to possible outcomes for the modulation scheme determination. If, however, the ratios are sufficiently small, less than a predetermined ratio value, as previously discussed, then the process can proceed with joint coding by concatenation 580 and transmission 590. Depending on the embodiment, the order of the size determination 530 and the ratio determination 570 can be switched. In certain embodiments, the size determination 530 is not made and the decision process relies solely on the ratio determination 570. Additional determinations can be possible.

Figure 6:
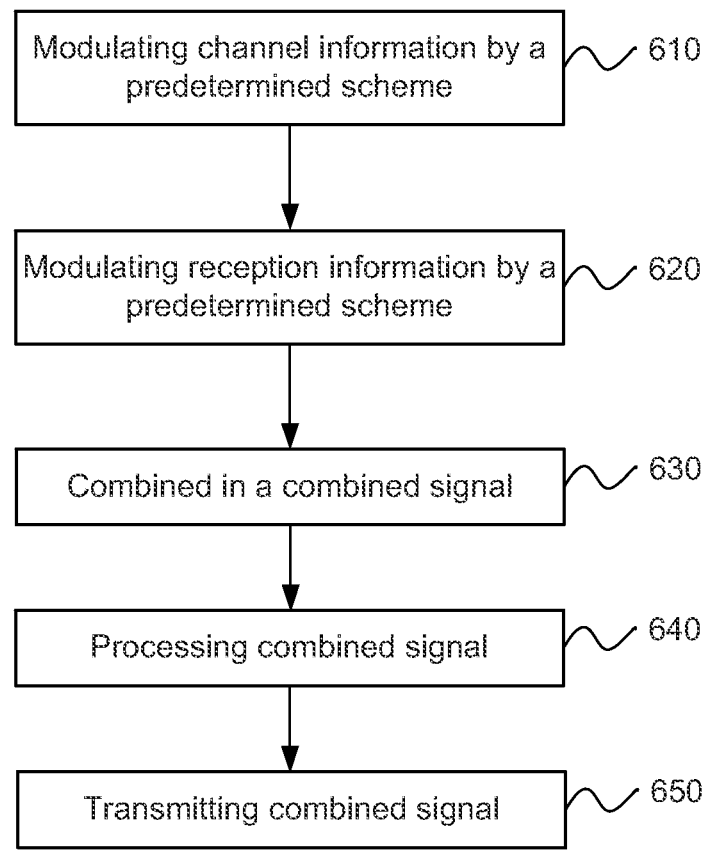
FIG. 6 is a flowchart depicting a generalized process to provide improved communication of feedback in accordance with another example.

FIG. 6 depicts a generalized process to provide improved communication of feedback by embedding different types of feedback information with additional information that assists in separating the different types of feedback information after transmission. The process comprises modulating 610 a first type of feedback information in accordance with a predetermined regime. Another type of feedback information is also modulated 620 in accordance with the predetermined regime.

Several examples of possible predetermined regimes have been provided in this specification, including, without limitation, modulation based on orthogonal multiplexing with orthogonal carrier codes/sequences, mapping to I and Q branches in a dual branch architecture, and concatenation according to a predefined scheme. Additional regimes are possible. Each of these regimes produces at least a first and second signal. The first and second signals include a first and second component of additional information respectively. Non-limiting examples of an additional component of information include an orthogonal carrier code, a phase shift, and/or the placement of one type of information in certain positions of concatenated data. These approaches provide additional information that can be used to isolate the corresponding type of feedback information after it has been combined with another type of information. The guiding principle of such regimes is to embed each type of feedback information with a unique component of additional information that will allow the various types of feedback information to be separated after combination and transmission at the receiving end of a communication link.

Once the various types of feedback information have been modulated 610, 620 in accordance with a predefined regime, they are combined 630 in a combined signal. In certain embodiments the combined signal is further processed 640 for uplink transmission. However, certain aspects of processing can occur before combination and before and during modulation. The combined signal is then transmitted 650.

Figure 7:
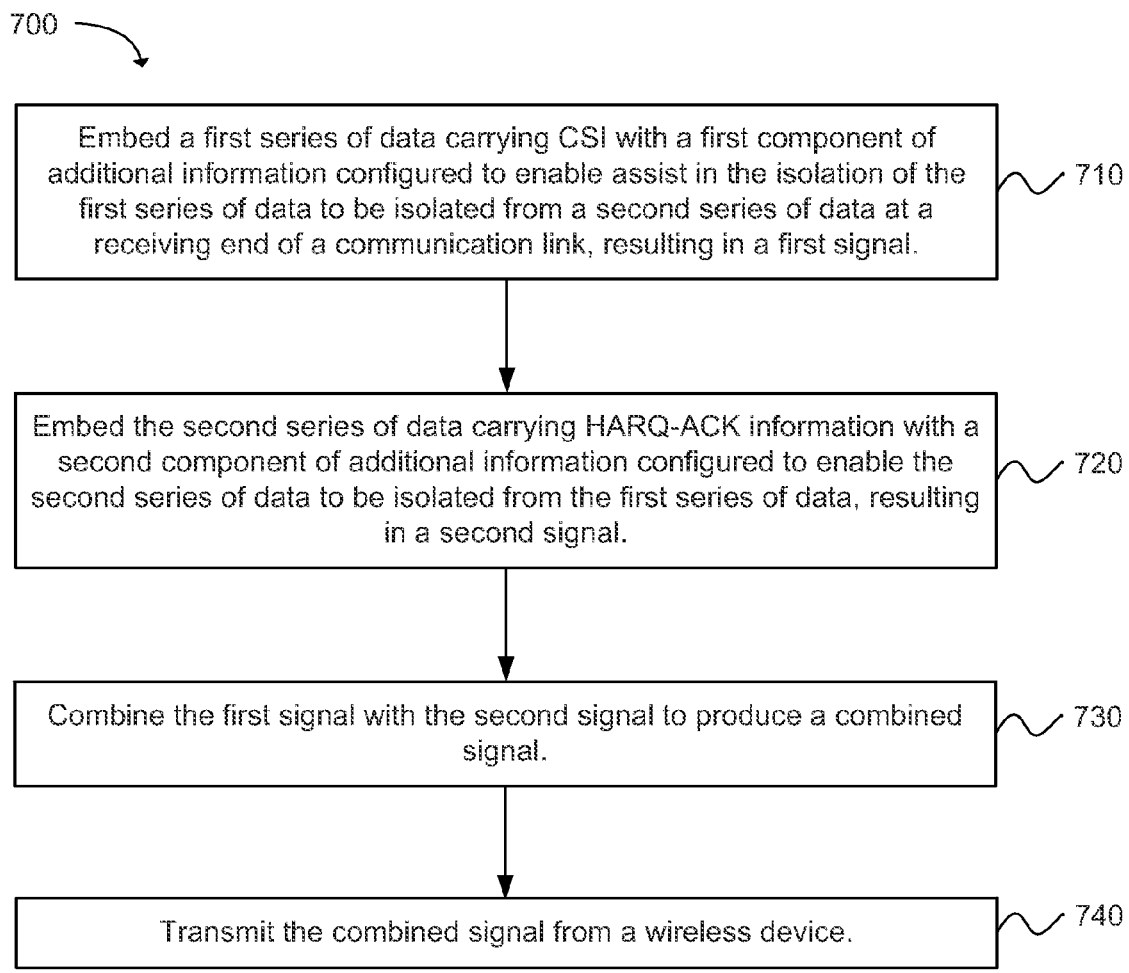
FIG. 7 is a flowchart depicting another generalized process to provide improved communication of feedback in accordance with another example.

FIG. 7 depicts another embodiment of a method 700 for concurrently transmitting channel and reception information from a wireless device. The method comprises embedding a first series of data carrying CSI with a first component of additional information. The first component additional information is configured to enable the first series of data to be isolated from a second series of data at a receiving end of a communication link. The first series of data and the first component of additional information result in a first signal, as shown in block 710.

The method 700 also comprises, as shown in block 720, embedding the second series of data carrying HARQ-ACK information with a second component of additional information configured to enable the second series of data to be isolated from the first series of data, resulting in a second signal. The method continues by combining the first signal with the second signal to produce a combined signal, as shown in block 730. Block 740 shows transmitting the combined signal from the wireless device.

In some embodiments, embedding the first series of data carrying the CSI and the second series of data comprises concatenating the first series of data and the second series of data according to a predefined concatenation scheme. The predefined concatenation scheme can make up the first component of additional information and the second component of additional information necessary to separate the first series of data and the second series of data after they have been combined. In certain embodiments, concatenation is only performed where at least one of a first condition and a second condition is met. The first condition can be that a sum of a first data series payload size of the first series of data and a second data series payload size of the second series of data is smaller than a predetermined value. The second condition is that a ratio of the first data series payload size over the second data series payload size is smaller than a predetermined ratio value.

In alternative embodiments, embedding the first series of data carrying the CSI with a first component of additional information and embedding the second series of data carrying the HARQ-ACK information with a second component of additional information comprises orthogonal multiplexing the first series of data and the second series of data in a single Physical Resource Block (PRB) semi-statically allocated for the first series of data to concurrently transmit the CSI and the HARQ-ACK information. Certain embodiments of this type can first require determining that one or more of a first condition, a second condition, and a third condition has been met. The first condition can be that a sum of a first data series payload size of the first series of data and a second data series payload size of the second series of data is not smaller than a predetermined value. The second condition can be that the ratio of the first data series payload size over the second data series payload size data is not smaller than a predetermined ratio value. The third condition is that a PUCCH resource for the first series of data and for the second series of data is co-located in a single PRB.

In such embodiments, orthogonal multiplexing the first series of data and the second series of data in the single PRB further comprises block spreading the first series of data carrying the CSI with a first sequence and the second series of data carrying the HARQ-ACK with a second sequence. The first sequence can be substantially orthogonal to the second sequence. Such embodiments can additionally include multiplying at least one of the first series of data and the second series of data by a power scaling factor after block spreading with the corresponding orthogonal first sequence and second sequence before combining the two series of data.

Similarly, processing the combined signal for transmission with Discrete Fourier Transform-Spread-Orthogonal Frequency Division Multiplexing (DFT-S-OFDM) can also be performed. Such embodiments can also include configuring the wireless device with at least one PUCCH Format 3 HARQ-ACK resource for CSI transmission in a single PRB semi-statically. Additionally, the first series of data and second series of data can be mapped to the single PUCCH format 3 PRB that is semi-statically allocated for CSI transmission after orthogonal block spreading and DFT-S-OFDM processing.

In further alternative embodiments, embedding the first series of data carrying the CSI with the first component of additional information and embedding the second series of data carrying the HARQ-ACK information with the second component of additional information can comprise mapping the first series of data carrying the CSI to one of an I branch and a Q branch of a dual branch modulation scheme comprising the first component of additional information and the second series of data carrying the HARQ-ACK information to the remaining branch of a dual branch modulation scheme comprising the second component of additional information. Such embodiments can also include multiplying the first and the second series of data by two different power scaling factors correspondingly before mapping to two branches of a dual branch modulation scheme. In certain embodiments, the first series of data carrying the CSI can be dropped and only the second series of data carrying the HARQ-ACK information transmitted where the UE is only configured for PUCCH transmission.

Referring back to FIG. 2a to FIG. 2c, modules for a device for supporting concurrent transmission of channel and reception information are depicted. Such a device includes a modulation module 206a, 206b, 206c operating at a UE. The modulation module is configured to modulate channel data/CSI 202a, 202b, 202c to assist in separating the channel data from reception data 204a, 204b, and 204c at an eNodeB. The modulation module is also configured to modulate the HARQ-ACK information data to assist in separating the reception data from the channel data at the eNodeB. The device also comprises a processing module 208a, 208b, and 208c. The processing module is configured to process combined data comprising the channel data 202a, 202b, 202c and the reception data 204a, 204b, 204c for transmission. Also included is a transmission module 210a, 210b, 210c configured to transmit the combined data.

Certain embodiments can be provided with a concatenation module 222 configured to concatenate data from the channel data/CSI 202a, 202b, 202c with data from the reception data/HARQ-ACK information 204a, 204b, 204c according to a predefined concatenation scheme. Similarly, some embodiments can be provided with a screening module 220 configured to first determine that at least one condition has not been obtained of a first condition and a second condition. The first condition is that a combined payload of the channel data/CSI and the reception data/HARQ-ACK information is smaller than a predefined value. The second condition is that a ratio of a CSI payload associated with the CSI over a HARQ-ACK payload associated with the HARQ-ACK information is smaller than a predefined ratio value. Where one or more of these conditions does not apply, the approach relying on orthogonal carrier codes, provided by the sequence module 212, can be employed.

In embodiments applying concatenation, however, before concatenation takes place, the screening module 220 can ensure that a combined payload of the channel data/CSI and the reception data/HARQ-ACK information is smaller than a predefined value. The screening module can also, or in the alternative, ensure that a ratio of a CSI payload associated with the channel data/CSI over a HARQ-ACK payload associated with the reception data/HARQ-ACK information is smaller than a predefined ratio value.

In certain embodiments, the device can further comprise a sequence module 212. The sequence module can be configured to provide a first sequence to the modulation module 206a, 206b, 206c to modulate the CSI, by block spreading the CSI with the first sequence, and a second sequence to the modulation module to modulate the HARQ-ACK information, by block spreading the HARQ-ACK information with the second sequence. The first sequence can be substantially orthogonal to the second sequence. Additionally, a combination module 216 can be provided, which is configured to combine the channel data/CSI and the reception data/HARQ-ACK information after modulation.

Alternative embodiments can be provided with a mapping module 218. The mapping module can be configured to map the channel data/CSI 202a, 202b, 202c to one of an I branch and a Q branch of a dual branch modulation and coding scheme. The mapping module can further map the reception data/HARQ-ACK information 204a, 204b, 204c to the remaining branch of the I branch and the Q branch of the dual branch modulation and coding scheme. Such embodiments can also be provided with a combination module 216 configured to combine the channel data/CSI and the reception data/HARQ-ACK information after modulation. Any of the previously discussed embodiments of the devise can be provided with a scaling module 214. The scaling module can be configured to scale a transmission power associated with at least one of the channel data and the reception data. Certain embodiments also include a scaling module 214 configured to multiply at least one of the CSI and the HARQ-ACK information by a power scaling factor after modulation and before the combination module combines the CSI and the HARQ-ACK information.

Figure 8:
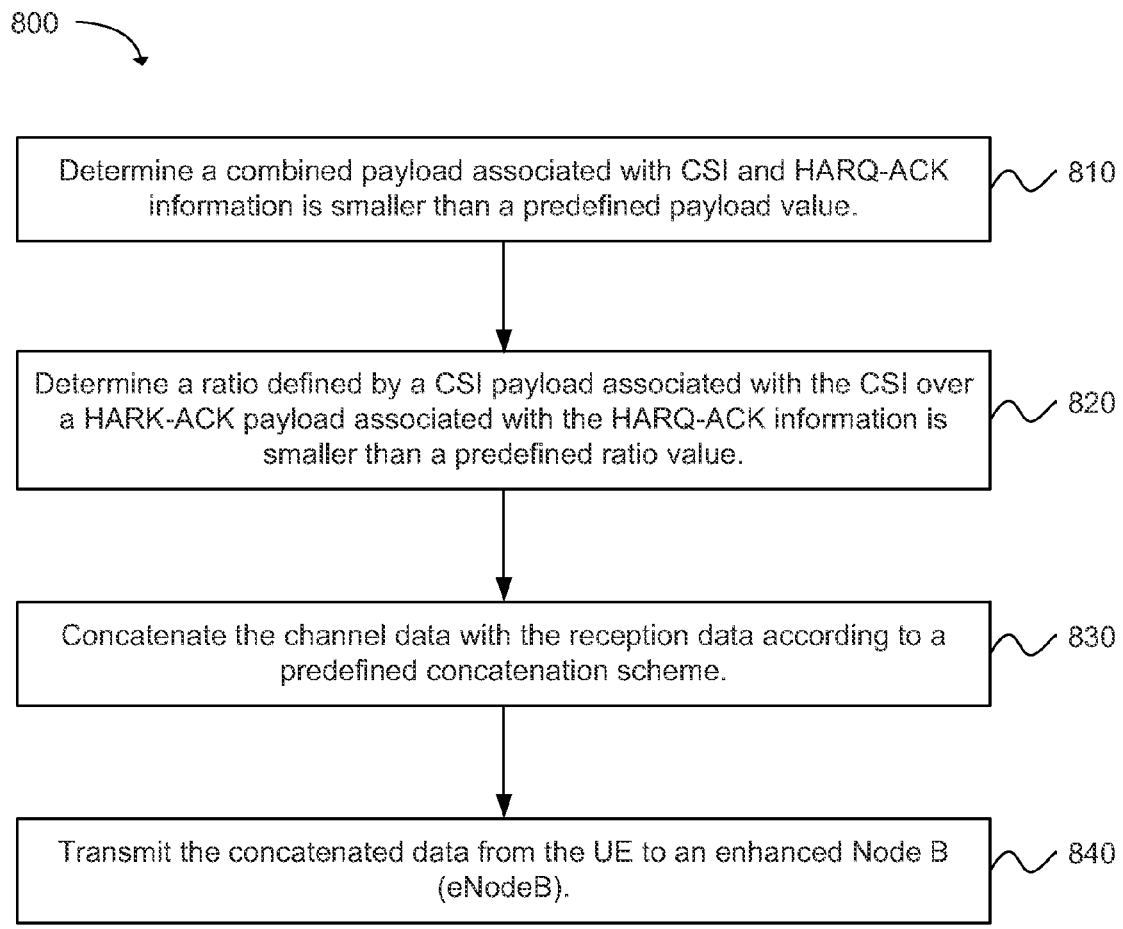
FIG. 8 is a flowchart depicting a process for determining the appropriateness of employing concatenation of different types of feedback data and executing embodiments employing such concatenation approaches in accordance with another example.

FIG. 8 depicts yet another embodiment of a method 800 for concurrently transmitting channel and reception information from a wireless device. The method 800 comprises determining, as shown in block 810, that a combined payload associated with CSI and HARQ-ACK information is smaller than a predefined payload value. Additionally, a determination is made that a ratio defined by a CSI payload associated with the CSI over a HARQ-ACK payload associated with the HARQ-ACK information is smaller than a predefined ratio value, as shown in block 720. The method continues, as depicted in block 730, by concatenating the channel data with the reception data according to a predefined concatenation scheme. In block 740, the concatenated data is transmitted from the UE to an eNodeB.

In certain embodiments, such a method 800 further comprises providing the eNodeB with the predefined concatenation scheme. Such embodiments can also comprise determining at least one of the predefined payload value and the predefined ratio value on the basis acceptable BERs. These acceptable BERs are based on the type of feedback data involved in the transmission.

Figure 9:
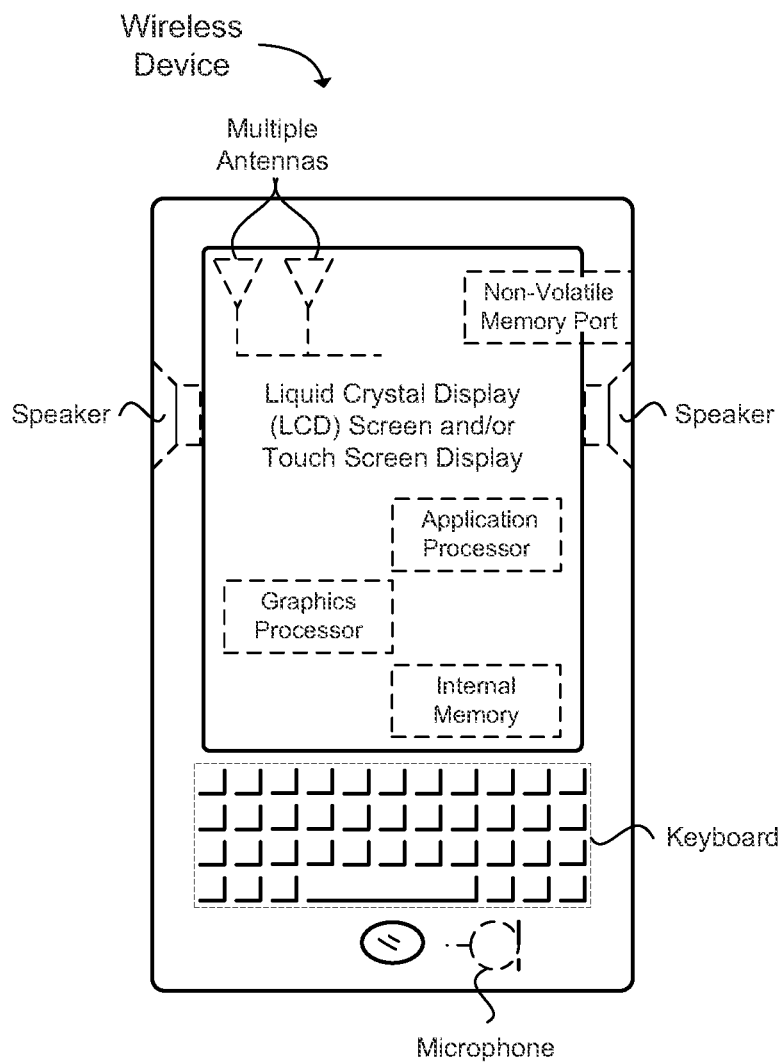
FIG. 9 is a block diagram of a UE in accordance with an example.

FIG. 9 provides an example illustration of a wireless device, such as UE, a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for concurrently transmitting a Channel State Information (CSI) and a Hybrid Automatic Repeat reQuest Acknowledgment (HARQ-ACK) information from a wireless device, comprising:

embedding a first series of data carrying the CSI with a first component of additional information configured to enable the first series of data to be isolated from a second series of data at a receiving end of a communication link, resulting in a first signal;

embedding the second series of data carrying the HARQ-ACK information with a second component of additional information configured to enable the second series of data to be isolated from the first series of data, resulting in a second signal;

concatenating the first series of data and the second series of data according to a predefined concatenation scheme when a first condition and a second condition are met, the predefined concatenation scheme comprising the first component of additional information and the second component of additional information, wherein the first condition is that a first data series payload size over a second data series payload size is smaller than a predetermined ratio value and the second condition is that the a sum of the first data series payload size of the first series of data and the second data series payload size of the second series of data is smaller than a predetermined value;

combining the first signal with the second signal to produce a combined signal; and transmitting the combined signal from the wireless device.

2. The method of claim 1, wherein embedding the first series of data carrying the CSI with a first component of additional information and embedding the second series of data carrying the HARQ-ACK information with a second component of additional information further comprises orthogonal multiplexing the first series of data and the second series of data in a single Physical Resource Block (PRB) semi-statically allocated for the first series of data to concurrently transmit the CSI and the HARQ-ACK information.

3. The method of claim 2, further comprising determining that at least one of a first condition, a second condition, and a third condition has been met, wherein:

the first condition is that a sum of a first data series payload size of the first series of data and a second data series payload size of the second series of data is not smaller than a predetermined value, the second condition is that the ratio of the first data series payload size over the second data series payload size is not smaller than a predetermined ratio value, the third condition is that a Physical Uplink Control Channel (PUCCH) resource for the first series of data and for the second series of data is co-located in a single Physical Resource Block (PRB).

4. The method of claim 2, wherein orthogonal multiplexing the first series of data and the second series of data in the single PRB further comprises:

block spreading the first series of data carrying the CSI with a first sequence; and block spreading the second series of data carrying the HARQ-ACK with a second sequence, wherein the first sequence is substantially orthogonal to the second sequence.

5. The method of claim 4, further comprising multiplying at least one of the first series of data and the second series of data by a power scaling factor after block spreading with the corresponding orthogonal first sequence and second sequence before combining the two series of data.

6. The method of claim 4, further comprising processing the combined signal for transmission with Discrete Fourier Transform-Spread-Orthogonal Frequency Division Multiplexing (DFT-S-OFDM).

7. The method of claim 4, further comprising configuring the wireless device with at least one PUCCH Format 3 HARQ-ACK resource for CSI transmission in a single PRB semi-statically.

8. The method of claim 7, wherein the first series of data and second series of data are mapped to the single PUCCH format 3 PRB that is semi-statically allocated for CSI transmission after orthogonal block spreading and DFT-S-OFDM processing.

9. The method of claim 1, wherein embedding the first series of data carrying the CSI with the first component of additional information and embedding the second series of data carrying the HARQ-ACK information with the second component of additional information further comprises:

mapping the first series of data carrying the CSI to one of an I branch and a Q branch of a dual branch modulation scheme comprising the first component of additional information; and mapping the second series of data carrying the HARQ-ACK information to the remaining branch of a dual branch modulation scheme comprising the second component of additional information.

10. The method of claim 1, further comprising multiplying the first and the second series of data by two different power scaling factors correspondingly before mapping to two branches of a dual branch modulation scheme.

11. The method of claim 1, further comprising dropping the first series of data carrying the CSI and only transmitting the second series of data carrying the HARQ-ACK information where the UE is only configured for PUCCH transmission.

12. A device for supporting concurrent transmission of a Channel State Information (CSI) and a Hybrid Automatic Repeat reQuest Acknowledgment (HARQ-ACK) information, comprising:

a modulation module operating at a User Equipment (UE), the modulation module configured to:

modulate the CSI to assist in separating the CSI from the HARQ-ACK information data at an evolved Node B (eNodeB), and modulate the HARQ-ACK information data to assist in separating the HARQ-ACK information from the CSI at the eNodeB;

a processing module configured to process combined data comprising the CSI and the HARQ-ACK information data for transmission;

a concatenation module configured to concatenate the CSI with the HARQ-ACK information according to a predefined concatenation scheme;

a screening module to determine that a ratio of a CSI payload associated with the CSI over a HARQ-ACK payload associated with the HARQ-ACK information is smaller than a predefined ratio value and determine that a combined payload of the CSI and the HARQ-ACK information is smaller than a predefined value; and a transmission module configured to transmit the combined data.

13. The device of claim 12, further comprising:

a sequence module configured to provide a first sequence to the modulation module to modulate the CSI by block spreading the CSI with the first sequence and to provide a second sequence to the modulation module to modulate the HARQ-ACK information by block spreading the HARQ-ACK information with the second sequence, wherein the first sequence is substantially orthogonal to the second sequence; and a combination module configured to combine the CSI and the HARQ-ACK information after modulation.

14. The device of claim 12, further comprising a screening module configured to first determine at least one condition has not been obtained of a first condition, a second condition, and a third condition, wherein:

the first condition is that a combined payload of the CSI and the HARQ-ACK information is not smaller than a predefined value, the second condition is that a ratio of a CSI payload associated with the CSI over a HARQ-ACK payload associated with the HARQ-ACK information is not smaller than a predefined ratio value, and the third condition is that a Physical Uplink Control Channel (PUCCH) resource for the SCI and for the HARQ-ACK information is co-located in a single Physical Resource Block (PRB).

15. The device of claim 12, further comprising:

a mapping module configured to:

map the CSI to one of an I branch and a Q branch of a dual branch modulation and coding scheme, and map the HARQ-ACK information to a remaining branch of the I branch and the Q branch of the dual branch modulation and coding scheme; and a combination module configured to combine the CSI and the HARQ-ACK information after modulation.

16. The device of claim 15, further comprising a scaling module configured to multiply at least one of the CSI and the HARQ-ACK by a power scaling factor after modulation and before the combination module combines the CSI and the HARQ-ACK information.

17. A computer program product for supporting concurrent transmission of a Channel State Information (CSI) and a Hybrid Automatic Repeat reQuest Acknowledgment (HARQ-ACK) information, comprising a non-transitory computer usable medium having a computer readable program code embodied therein, the computer readable program code adapted to be executed at a User Equipment (UE) to implement a method for concurrent transmission of the CSI and the HARQ-ACK information, comprising:

screening to determine that a first condition has been met, wherein the first condition is that a ratio of a CSI payload associated with the CSI over a HARQ-ACK payload associated with the HARQ-ACK information is smaller than a predefined ratio value;

screening to determine that a second condition has been met, wherein the second condition is that a combined payload associated with the CSI and the HARQ-ACK information is smaller than a predefined value;

modulating the CSI according to a predetermined regime, and modulating the HARQ-ACK information according to the predetermined regime, wherein the predetermined regime is configured to allow the CSI and the HARQ-ACK information to be separated after the CSI and the HARQ-ACK information have been combined and wherein modulating the CSI and the HARQ-ACK information according to the predetermined regime further comprises concatenating the CSI with the HARQ-ACK information in accordance with a predefined concatenation scheme;

combining the CSI and the HARQ-ACK information to form a combined signal; and transmitting the combined signal.

18. The computer program product of claim 17, wherein modulating the CSI and the HARQ-ACK information according to the predetermined regime further comprises:

providing a first sequence with which to modulate the CSI by block spreading the CSI with the first sequence;

providing a second sequence with which to modulate the HARQ-ACK information by block spreading the HARQ-ACK information with the second sequence, wherein the first sequence and the second sequence are substantially orthogonal to one another.

19. The computer program product of claim 18, further comprising selecting the modulation scheme of claim 18 upon determining that at least one of a first condition, a second condition, and a third condition has been met, wherein:

the first condition is that a combined payload of the CSI and the HARQ-ACK information is not smaller than a predefined value, the second condition is that a ratio of a CSI payload associated with the CSI over a HARQ-ACK payload associated with the HARQ-ACK information is not smaller than a predefined ratio value, and the third condition is that a Physical Uplink Control Channel (PUCCH) resource for the SCI and for the HARQ-ACK information is co-located in a single Physical Resource Block (PRB).

20. The computer program product of claim 17, wherein modulating the CSI and the HARQ-ACK information according to the predetermined regime further comprises:

directing the CSI for modulation along one of two branches of a dual branch modulation and coding scheme; and directing the HARQ-ACK information for modulation along a remaining branch of the dual branch modulation and coding scheme.

\* \* \* \* \*